Nov. 10, 1931.  A. F. SULZER  1,831,792
PHOTOGRAPHIC FILM FOR PICTURE AND SOUND REPRODUCTION
Filed June 17, 1929
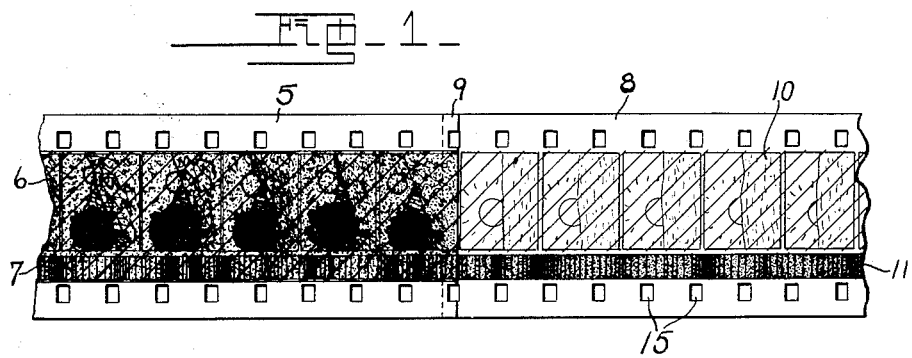
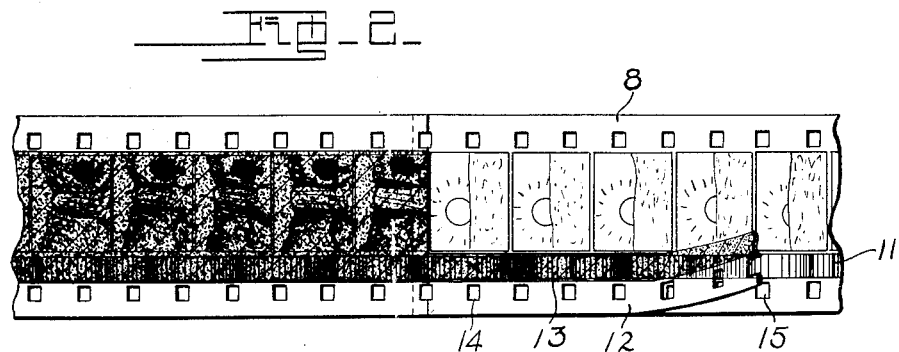
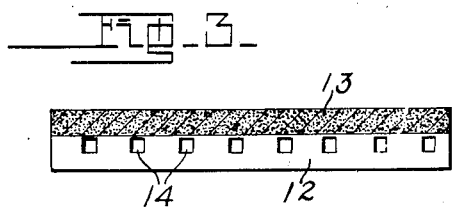
Inventor
Albert F. Sulzer
By H. M. Terrius
Attorney Patented Nov. 10, 1931

1,831,792

UNITED STATES PATENT OFFICE

ALBERT F. SULZER, OF ROCHESTER, NEW YORK, ASSIGNOR TO EASTMAN KODAK COMPANY, OF ROCHESTER, NEW YORK, A CORPORATION OF NEW YORK

PHOTOGRAPHIC FILM FOR PICTURE AND SOUND REPRODUCTION

Application filed June 17, 1929. Serial No. 371,351.

This invention relates to photographic film for use in the synchronized reproduction of sound and motion pictures from the same photographic record.

In the patent of Loyd A. Jones, No. 1,769,518 granted July 1, 1930, there are disclosed a series of films tinted over the entire picture and sound track or sound record areas with tints of such character that the transmission therethrough is uniform and of such character as to operate a photoelectric cell efficiently. It frequently happens that it is desirable to combine such tinted film with "clear sound track" film, that is film having an untinted sound track and tinted or untinted picture areas with the result that at the transition from the section of tinted to such "clear sound track" film there is an unpleasant sound volume variation.

In accordance with the present invention it is proposed to apply to the sound record portion only of such clear sound track film, material which has substantially the same transmission characteristics as the tinted film. In accordance with another feature of the invention it is proposed to apply to the sound track or record portion of a film, a strip of flexible material bearing a dye layer or other suitable medium whereby the transmission through the sound record and the strip are substantially the same as that of tinted film.

For a clearer understanding of the invention reference is made to the drawings in which Fig. 1 shows a strip of film formed of a section of tinted film spliced to a section of normally clear sound track film having its sound track or record area treated in accordance with the present invention; Fig. 2 is a modified form of the invention representing a piece of film formed of a section of tinted film and a section of untinted film having a strip applied thereto to modify the transmission of its sound record; and Fig. 3 is a plan view of such a strip for use in connection with the untinted film of Fig. 2.

In Fig. 1 there is represented a section of film 5 having its picture areas 6 and its sound track or record area 7 tinted in accordance with the teachings of the mentioned Jones patent. This section is spliced at point 9 to a section of "clear sound track" film 8 likewise provided with tinted picture areas 10 and an untinted sound track or record area 11. When such a composite strip of film is reproduced, there is an unpleasant sound volume variation in passing from the sound record 7 to the sound record 11 which is due to the fact that the tinted layer over the sound record 7 absorbs more of the radiations to which the light sensitive cell of the sound reproducing device is responsive than the corresponding sound record area 11. It is therefore proposed to apply to the sound record area 11 material which has substantially the same radiation absorbing power as the tinted layer applied to the sound record 7. Suitable material, which may be applied to this sound record, is disclosed in the mentioned patent of Loyd A. Jones and is referred to therein as a "pearl" tint. When this pearl tint is used on the sound record 11, it may be applied as a layer of tint by any suitable applicator or tinting roll on either side of the film, preferably on the support side.

Instead of applying a layer of tint directly to the film there is shown in Fig. 2 a modified arrangement in which the transmission or radiation absorbing character of this sound record 11 is controlled by applying thereto on either side of the film a strip 12 having a portion 13 treated with suitable material as previously mentioned and adapted to overlap the sound record and to be adhesively connected to the film section 8. While it is understood that the strip may include only the area 13, it is preferable to provide a margin 12 with a series of perforations 14 spaced to register with the perforations 15 of the film section 8. In this way, when the perforations 14 and 15 are in exact registry, the strip 13 will coincide exactly with the sound record 11. It is intended that the strips such as 13 or the strips of the form shown in Fig. 3 may be produced and sold as a separate article of manufacture so that motion picture producers may prepare untinted film whereby the sound record portion thereof may have the same sound reproducing characteristics as the record 7 of the tinted film section shown in section 6.

It is obvious that numerous embodiments are possible and I contemplate as included in my invention all such modifications and equivalents as fall within the scope of the appended claims.

What I claim is:

1. A strip of motion picture film having parallel longitudinally extending picture and sound record areas adapted to be used with a film having correspondingly positioned picture and sound record areas and having a tinted layer coextensive therewith, the sound record area only of said strip of film being treated with a material having substantially the same characteristics for the purpose of sound reproduction as those of the tinted sound record area of the complementary film with which it is intended for use.

2. A photographic film having an untinted longitudinally extending picture area and a sound record area parallel therewith and carrying a layer of uniform density substantially greater than the density of the film material alone.

3. A photographic film having a longitudinally extending untinted picture area and a sound record area parallel thereto and having a uniform neutral density greater than the density of the film material alone.

4. A photographic film having longitudinally extending picture and sound record areas and a strip of uniform density attached to the film in superimposed relation with respect to the sound record area only.

5. A photographic film having longitudinally extending picture and sound record areas and a flexible strip of uniform neutral density covering said sound record area and one margin of said film.

Signed at Rochester, New York, this 11th day of June 1929.

ALBERT F. SULZER.